United States Patent
Rhoads

(10) Patent No.: US 6,181,104 B1
(45) Date of Patent: Jan. 30, 2001

(54) RECHARGEABLE COFFEE AND SPICE GRINDER

(76) Inventor: Theodore Rhoads, 6050 Tally Ho, Cave Creek, AZ (US) 85531

(*) Notice: Under 35 U.S.C. 154(b), the term of this patent shall be extended for 0 days.

(21) Appl. No.: 09/556,400

(22) Filed: Apr. 24, 2000

(51) Int. Cl.$^7$ ............................................. H02J 7/00
(52) U.S. Cl. ........................................ 320/114; 320/107
(58) Field of Search .................................. 320/144, 107; 241/69, 169.1; 429/96–100

(56) References Cited

U.S. PATENT DOCUMENTS

| 4,225,814 | 9/1980 | Gantz et al. | 320/115 |
| 4,591,777 | 5/1986 | McCarty et al. | 320/110 |
| 5,075,615 | 12/1991 | Dantis | 320/111 |
| 5,124,532 | 6/1992 | Hafey et al. | 219/200 |
| 5,208,896 | * 5/1993 | Katayev | 392/444 |
| 5,372,514 | 12/1994 | Odemer et al. | 439/136 |
| 5,785,264 | * 7/1998 | Yang | 241/169.1 |
| 6,015,106 | * 1/2000 | Turgeon et al. | 241/69 |

* cited by examiner

Primary Examiner—Peter S. Wong
Assistant Examiner—Lawrence Luk

(57) ABSTRACT

A rechargeable coffee or spice grinder having rechargeable batteries that are recharged by induction current supplied by a recharging station. The recharging station is plugged into a conventional a.c. wall outlet, such as in a kitchen, and has a charging probe that induces a charge in the charging unit of the grinder without any wires interconnecting the grinder to the station. The grinder's charging unit connect to rechargeable batteries that operate a motor. This motor is used to spin blades to grind an inserted food product placed in a basket within the grinder, such as coffee beans or spices. An opening on the bottom of the grinder serves as an input for the charging probe of the charging station. After material is ground, the grinder can be turned upside down which moves the material to the grinder's removable lid. The lid is used to store and transport the ground material, like ground coffee beans, to a coffee maker. The charging station normally is supported by a flat horizontal surface, like a kitchen counter, and has a vertical component with a vertically adjustable portion having a plug end. The height of the plug may be vertically adjustable to accommodate wall plug outlets located at different heights above the kitchen counter.

5 Claims, 1 Drawing Sheet

RECHARGEABLE COFFEE AND SPICE GRINDER

BACKGROUND OF THE INVENTION

This invention relates to a rechargeable coffee or spice grinder with rechargeable batteries that are recharged by a recharging station.

Many types of electrically operated rechargeable devices products are known to the prior art. For example, in one earlier invention a recharging system for a cordless hand held vacuum cleaner is disclosed having a recharging base. In another earlier system a multi-station for recharging batteries in cordless tools, such as vacuum cleaners, can openers and brushes is disclosed.

Another prior art recharging system has a station for a cordless razor. While another recharging system discloses a recharging station for hair salon tools.

Still another such system a holding device for a battery operated appliance is disclosed.

DESCRIPTION OF THE PRIOR ART

Various types of recharging systems for battery operated devices, like tools and other cordless appliances, are known to the prior art. For example, U.S. Pat. No. 4,225, 814 to Gantz et al. discloses a system for a cordless hand held vacuum cleaner which has a recharging base.

U.S. Pat. No. 4,591,777 to McCarty et al. discloses a multi-station for recharging batteries in cordless tools, such as vacuum cleaners, can openers and brushes is disclosed.

U.S. Pat. No. 5,075,615 to Dantis discloses recharging system has a station for a cordless razor.

U.S. Pat. No. 5,124,532 to Hafey et al. discloses a recharging station for hair salon tools.

U.S. Pat. No. 5,372,514 to Odemer et al. discloses a holding device for a battery operated appliance is disclosed.

In the present invention a rechargeable coffee or spice, or both, grinder has rechargeable batteries which are recharged by inducing a charge in the grinder from the recharging holster all as will be detailed in the specification that follows hereafter.

SUMMARY OF THE INVENTION

This invention relates to a rechargeable coffee or spice grinder having a rechargeable battery pack that is recharged by placing the grinder into a recharging station.

It is the primary object of the present invention to provide for a rechargeable grinder which is recharged by placing the grinder into a station having a battery charger.

Another object is to provide for such a system in which a cordless grinder may utilize a combination grinding blade that enables the grinder to grind coffee beans or spices.

These and other objects and advantages of the present invention will become apparent to readers from a consideration of the ensuing description and the accompanying drawings.

DESCRIPTION OF THE PREFERRED EMBODIMENT

Figure 1:
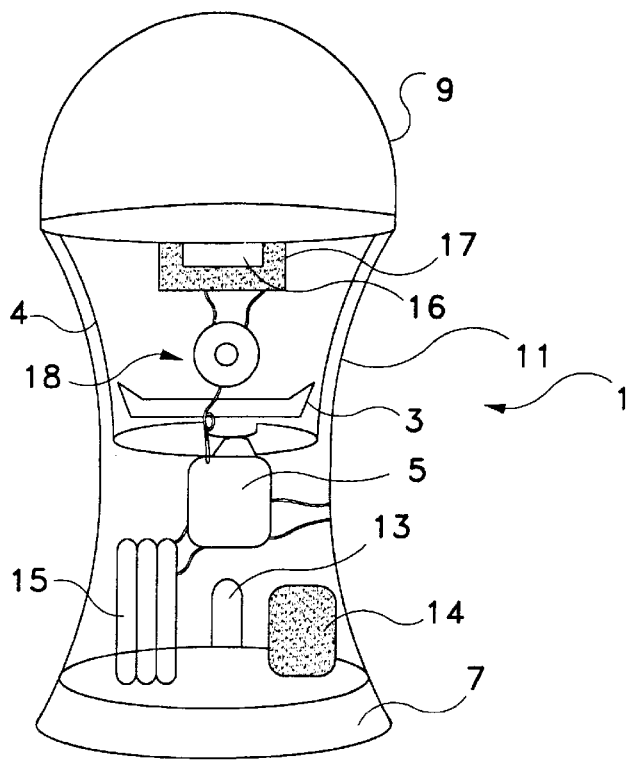
FIG. 1 is a side perspective view of the grinder used in the present invention with the lower front wall removed to show the interior contents.

FIG. 1 is a side perspective view of the grinder used in the present invention with the lower front wall removed to show the contents of the interior. A hand held grinder 1, shown in the upright position when used, has an interior spinning blade 3 that is located in the grinding basket 4. A small electrically motor 5 fixed to the side wall of the grinder is operatively associated and connected to the blade to causes the blade to spin when electrical power is supplied. The opened grinder housing bottom 7 is adjacent the induction probe opening 13 and the recharging unit 14 and the battery pack 15. The wall opening 13 is located near the base or bottom 7 and is adapted to permit an internal probe (not shown in this figure, see FIG. 2) from a charging station to enter the grinder body from the side and induce current in the unit 14.

At the top of the grinder 1 is a removable lid 9 shown with its front wall in place. The lid 9 is mounted on the main grinder body 11 whose front wall is removed in this view. Coffee beans or other food products, like spices, that are to be ground by the spinning blade 3 are inserted into the hollow confines of the grinder by removing the lid 9. A small safety tab 16 at the interface between the lid and main body 11 may be used to permit easy removal of the lid and to actuate a safety switch 17. The safety tab 16 must engage the safety switch 17 to complete the electrical circuit from the power button switch 18 (located on the back wall of body 11 and extending into the grinder's interior) to the electrically operated motor 5. By removing the upper lid 9, coffee beans or other food products to be ground can be inserted into the grinding basket 4 that houses the spinning grinder blade 3. The coffee beans or food products contact the blade 3 and are ground into a powder. After grinding to the desired consistency, the grinder can then be turned upside down and their ground processed products will fall into the hollow lid 9.

At the lower end of the main housing 11 is the base 7 which has electric induction type charging opening 13, shown on the housing's back wall. The opening 13 is connected to the recharging system 14 and also to the its own rechargeable battery back 15 by wires. The battery pack is electrically connected by wires to the electric motor 5. Normally, the motor 5 is powered by the battery pack 15 which is capable of being continuously charged by the charging unit 14. There is no direct physical contact between the motor and an induced external power source (not shown in this view). Such induction charging systems are commonly found on many electronic cordless toothbrushes commercially available at this time. By using induction charging at the charging station unsightly wires that connect the grinder to the wall are eliminated.

The grinding blade 3 can be a single multifunctional can be used to grind up different food materials. Such multifunctional grinding blades are available on most food grinders commercially available today. A power button switch 18, shown mounted on the side of the body 11, is connected by wires to the motor 5 which allows the external control of the motor by a user.

Figure 2:
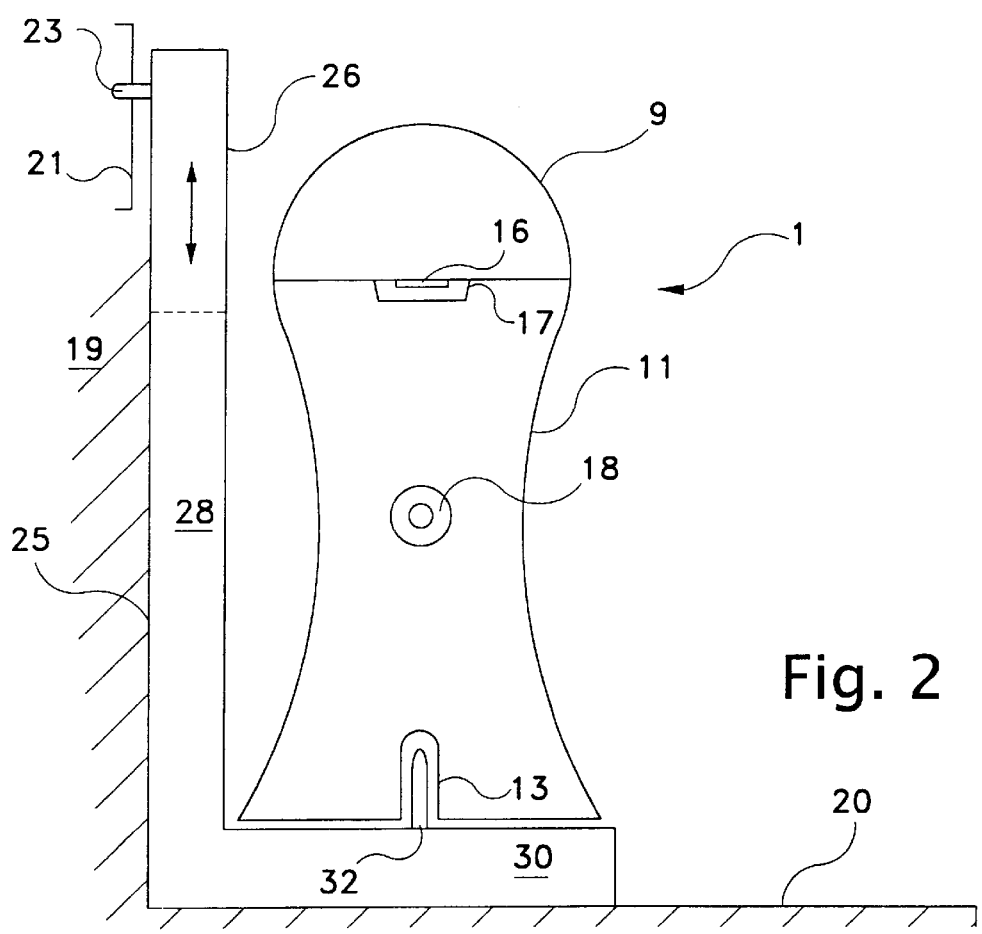
FIG. 2 is a side view from the opposite showing the grinder mounted in a charging station on a kitchen counter.

FIG. 2 is a side view showing the side opposite from that of FIG. 1 with the grinder mounted in a holster that sits on a kitchen counter 20. In this view the front wall of the grinder's lower body 11 is in place and the grinder's interior components are not visible. The grinder is the same as that shown in FIG. 1 and common visible parts bears the same numbers. The kitchen wall 19 has a conventional wall mounted alternating current plug outlet system 21 which mates with a utility plug 23 built into the charging station unit 25. The charging station unit's upper adjustable vertical component 26, which includes the utility plug end 23, is mounted on the lower portion 28 of the vertical component to permit the vertical height adjustment of the plug to accommodate wall plug outlets 21 located at different heights above the supporting kitchen counter. A telescoping mount of the two vertical components (26 and 28) may be used for this purpose with appropriate stops to fix the upper plug portion at a desired vertical level relative to the fixed counter 20 and station's base 30. Internal wires supply electrical current to the internal station charging probe 32, shown inserted into the opening 13 in the lower section of the body 11. When the probe is mounted in place properly into the lower side of the grinder, current is induced on the grinder's charging unit 14. This induces a charge in the charging unit 14 is this charge is what supplies electrical power to the grinder's batteries and motor 5 used to turn the blades 3.

No wires would directly connect the charging opening 13 to the station charging probe unit. The only direct electrical contact to the station is between the plug 23 of the station and the conventional wall outlet 21. Using induction charging eliminates the possibility of dirty electrical contacts that engage the battery unit in the grinder's wall charging opening 13.

In use, the user places the material to be ground in the basket 4 by first removing, inserting the material and then replacing the lid 9. In one embodiment of the invention, the material to be ground was less than one ounce and could be up to a total of three ounces. When in an upright position as shown, the material to be ground, like coffee beans, stays in the basket 4 and is ground by the spinning grinding blade 3. Blade 3 is actuated to spin by depressing external button 18 to supply energy to grind the beans. Once fully ground, the grinding unit 1 is turned off and placed in an upside down position from that shown in the two figures and their ground products are deposited by gravity into the holding hollow lid 9. This detachable storage lid 9 may them be detached from the body 11 of the grinder and its ground bean contents transported and used to make coffee in a coffee maker. A similar method would be used to grind and store other processed food products.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. The combination of a rechargeable grinder and a recharging station comprising:

a grinder having a hollow lower body portion and an upper removable lid mounted on said lower body portion;

said grinder having an electrically operated spinning blade operated by an electrical motor within said lower body portion, said motor being connected to and provided with electrical power from a rechargeable battery connected to a battery charging unit in the lower body portion; and a charging station mountable on a support surface, said charging station having a lower support surface and a vertically adjustable extension with an plug, said plug being connectable to an external wall outlet source of alternating electrical current, said charging station also having a station charging probe operatively connected to the plug of the station and capable of inducing an electrical current in said battery charging unit in the grinder when the grinder is mounted on the charging station.

2. The combination as claimed in claim 1, wherein said grinder's lower body portion has a wall with an opening to receive the charging probe of the charging station.

3. The combination as claimed in claim 2, wherein said grinder has an internal basket mounted within the lower body portion of the grinder, said basket around the blade whereby said basket may receive ground material from the blade.

4. The combination as claimed in claim 3, wherein said upper removable lid is mounted to receive and store ground material from the basket of the lower portion when placed below the basket.

5. The combination as claimed in claim 4, wherein said vertically adjustable extension of said charging station has the station's plug mounted in a movable vertical member of the charging station, said movable member being vertically adjustable with respect to the station's lower support surface to permit the insertion of the plug into wall outlets of different vertical heights above the supporting surface.

* * * * *